United States Patent
Renken et al.

(10) Patent No.: US 11,738,623 B2
(45) Date of Patent: Aug. 29, 2023

(54) TRANSPORT CLIMATE CONTROL REMOTE MANAGEMENT

(71) Applicant: THERMO KING LLC, Minneapolis, MN (US)

(72) Inventors: David J. Renken, Prior Lake, MN (US); Tony Spetz, Afton, MN (US); Matthew Srnec, Minnetonka, MN (US); Mark D. Leasure, Eagan, MN (US)

(73) Assignee: THERMO KING LLC, Minneapolis, MN (US)

( * ) Notice: Subject to any disclaimer, the term of this patent is extended or adjusted under 35 U.S.C. 154(b) by 148 days.

(21) Appl. No.: 17/218,841

(22) Filed: Mar. 31, 2021

(65) Prior Publication Data

US 2022/0314741 A1    Oct. 6, 2022

(51) Int. Cl.
  *B60H 1/00*    (2006.01)
  *G05B 19/4155*    (2006.01)
  *F25D 11/00*    (2006.01)

(52) U.S. Cl.
  CPC ..... *B60H 1/00964* (2013.01); *B60H 1/00978* (2013.01); *G05B 19/4155* (2013.01); *F25D 11/003* (2013.01); *G05B 2219/37375* (2013.01)

(58) Field of Classification Search
  CPC ............ B60H 1/00964; B60H 1/00978; B60H 1/00657; B60H 1/3232; G05B 19/4155;
  (Continued)

(56) References Cited

U.S. PATENT DOCUMENTS 3,692,100 A * 9/1972 Gallagher, Jr. ........ G05D 23/20
  62/211
5,129,235 A * 7/1992 Renken ................... F25D 19/04
  454/91
(Continued)

FOREIGN PATENT DOCUMENTS

CN    107610423    1/2018
CN    110505586    11/2019
(Continued)

OTHER PUBLICATIONS

U.S. Appl. No. 16/917,328, filed Jun. 30, 2020, titled "Isolated Evaporator Coil for a Transport Climate Control System", 29 pages.
(Continued)

*Primary Examiner* — Nelson J Nieves
*Assistant Examiner* — Matthew John Moscola
(74) *Attorney, Agent, or Firm* — Hamre, Schumann, Mueller & Larson, P.C.

(57) ABSTRACT

A method of remotely managing a transport climate control system (TCCS) includes a remote management device receiving performance data from the TCCS. The performance data based on one or more detected operating parameters of the climate control circuit. The method also including the remote management device providing the performance data to one or more user devices. A remote management system includes a remote management device configured to receive performance data for a climate control circuit from a climate controller of a TCCS and to provide the performance data to one or more user devices. A TCCS includes a controller configured to: generate performance data based on the one or more detected operating parameters of a climate control circuit, and transmit the performance data to a remote monitoring device. The climate controller
(Continued)

also configured to receive an operating instruction from the remote monitoring device.

20 Claims, 3 Drawing Sheets

(58) Field of Classification Search
CPC ......... G05B 2219/37375; F25D 11/003; Y02T 10/88
See application file for complete search history.

(56) References Cited

U.S. PATENT DOCUMENTS

| | | | |
|---|---|---|---|
| 8,877,274 B2 | 11/2014 | Bell | |
| 8,994,546 B2 | 3/2015 | Breed et al. | |
| 10,188,224 B2 | 1/2019 | Fischer | |
| 10,377,209 B2 | 8/2019 | Kolda et al. | |
| 2008/0270076 A1 | 10/2008 | Breed | |
| 2010/0070084 A1* | 3/2010 | Steinberg | F24F 11/47 700/276 |
| 2011/0221573 A1* | 9/2011 | Huat | F25D 29/003 340/10.1 |
| 2014/0262130 A1* | 9/2014 | Yenni | F24F 11/89 165/11.1 |
| 2015/0135737 A1* | 5/2015 | Cresswell | F25D 11/003 62/190 |
| 2016/0159198 A1* | 6/2016 | Tang | G05D 23/1393 700/300 |
| 2019/0299749 A1 | 10/2019 | Lattin | |
| 2021/0001689 A1 | 1/2021 | Kondrk et al. | |
| 2021/0262727 A1* | 8/2021 | Heide | H04W 12/08 |

FOREIGN PATENT DOCUMENTS

| | | |
|---|---|---|
| CN | 110926091 | 3/2020 |
| WO | 2017/165518 | 9/2017 |
| WO | 2020/051314 | 3/2020 |
| WO | 2021/046107 | 3/2021 |

OTHER PUBLICATIONS

U.S. Appl. No. 16/917,351, filed Jun. 30, 2020, titled "Air Management System for Climate Control Unit of a Transport Climate Control System", 23 pages.
U.S. Appl. No. 16/917,365, filed Jun. 30, 2020, titled "Systems and Methods for Transport Climate Control Circuit Management and Isolation", 50 pages.
U.S. Appl. No. 16/917,374, filed Jun. 30, 2020, titled "Systems and Methods for Protecting Sealed Compressor Electrical Feedthrough", 44 pages.
Extended European Search Report, issued in the corresponding European patent application No. 22166136.6, dated Sep. 1, 2022, 9 pages.

* cited by examiner

TRANSPORT CLIMATE CONTROL REMOTE MANAGEMENT

FIELD

This disclosure generally relates to transport climate control systems. More specifically, this disclosure relates to remote management of a transport climate control system.

BACKGROUND

A transport climate control system is generally used to control environmental condition(s) (e.g., temperature, humidity, air quality, and the like) within a climate controlled space of a transport unit (e.g., a truck, trailer, a container (such as a container on a flat car, an intermodal container, etc.), a box car, a semi-tractor, a bus, or other similar transport unit). The transport climate control system can include, for example, a transport climate control system ("TCCS"). The TCCS can control environmental condition(s) within the climate controlled space to maintain cargo (e.g., produce, frozen foods, pharmaceuticals, electronics, etc.). In some transport units, the transport climate control system can be installed externally (e.g., on a rooftop of the transport unit, under the transport unit, on a front wall of the transport unit, etc.).

The transport climate control system can include a climate control circuit with a compressor, a condenser, an expansion valve, and an evaporator. A working fluid can include, for example, a refrigerant that can be compressed and expanded as it flows through the climate control circuit and can be used to heat and/or cool the particular space.

BRIEF SUMMARY

The embodiments described herein are directed to a transport climate control system ("TCCS"), a remote management system for a TCCS, and a method of remotely managing the TCCS.

In particular, the embodiments described herein can allow for remotely viewing performance of a TCCS and managing the control settings of a TCCS.

A climate controlled transport units ("CCTU") can have a climate controlled space that can be used for storing cargo or transporting people that is provided climate control (for controlling e.g., temperature, humidity, atmosphere, etc.) by a climate control circuit of climate control unit ("CCU") of a CCTU. The climate control circuit can utilize a working fluid that includes refrigerant. The CCTU can employ refrigerant leak safety systems that reduce or stop operation of the climate control circuit to mitigate leaking of the refrigerant. The reduced or stopped operation of the climate control circuit can cause damage to cargo stored in the climate controlled space due to the TCCS no longer being able to providing sufficient conditioning to maintain desired climate conditions (e.g., temperature, humidity, etc.) within the climate controlled space. This can lead to the damage (e.g., degradation, spoilage, loss, etc.) of valuable goods (e.g., high value goods, critical goods).

Disclosed embodiments are capable of operating the TCCS to remotely and selectively report performance of the TCCS to multiple parties (e.g., manufacturer, servicer, dispatcher, etc.). Disclosed embodiments can, for example, remotely adjust operation of the TCCS based on the load being transported. Disclosed embodiments can, for example, allow for remotely adjusting operation of the TCCS to override safety settings/systems of the TCCS.

In an embodiment, a method of remotely managing a transport climate control system (TCCS) of a climate controlled transport unit includes a remote management device receiving performance data for a climate control circuit from a climate controller of the TCCS. The climate control circuit is for conditioning a climate controlled space of the climate controlled transport unit. The performance data is generated by the climate controller based on one or more detected operating parameters of the climate control circuit. The remote management device is remote from the climate controlled transport. The method also includes providing, via the remote management device, the performance data to a plurality of user devices.

In an embodiment, the remote management device includes a remote server.

In an embodiment, the method also includes comparing, with the remote management device, the performance data for the climate control circuit to historical performance data for the climate control circuit. The method also includes generating a refrigerant leak warning based on the comparison of the performance data and the historical performance data.

In an embodiment, the remote management device transmits the refrigerant leak warning to the climate controller via the telematics unit.

In an embodiment, the performance data includes one or more of: refrigerant superheat, refrigerant subcooling, a temperature of working fluid in a climate control circuit, a pressure of the working fluid, status of an isolation valve in the climate control circuit, amperage to a compressor in the climate control circuit, a valve position of an expansion valve in the climate control circuit, a status of a refrigerant leak safety system of the climate control circuit.

In an embodiment, the one or more operating parameters of the climate control circuit include one or more of: a temperature of working fluid in a climate control circuit of the climate control circuit, a pressure of the working fluid, status of an isolation valve in the climate control circuit, amperage to a compressor in the climate control circuit, and a valve position of an expansion valve in the climate control circuit.

In an embodiment, the method includes the remote management device transmitting an operating instruction to the climate controller via the telematics unit, the operating instruction modifying a predetermined operation setting of the climate controller for operating the climate control circuit.

In an embodiment, the operation instruction causes the climate controller to override a predetermined operating limit for the climate control circuit.

In an embodiment, the climate controller overrides the predetermined operating limit by adjusting or ignoring the predetermined operating limit.

In an embodiment, the operating instruction causes the climate controller to ignore a predetermined shutdown parameter for operating a compressor of the climate control circuit.

In an embodiment, the plurality of user devices includes a first user device. The method also including the first user device providing operation input for the CCTU to the remote management device. The operation input causes the remote management device to transmit the operating instruction.

In an embodiment, the operation input is cargo value information for the CCTU. The remote management device generates the operating instructions based on the goods information.

In an embodiment, the method includes storing the performance data in a memory of the climate controller. The plurality of user devices includes a first user device and a second user device. Providing the performance data to the plurality of user devices includes: providing the first user device with the performance data stored on the remote management device at a first access level, and providing the second user device with the performance data stored in the remote management device at a second access level. The second access level limits access to the performance data relative to the first access level.

In an embodiment, a remote management system is for a TCCS of a climate controlled transport unit. The TCCS includes a climate control circuit for conditioning an internal space of the refrigerated transport unit. The remote management system includes a remote management device configured to receive performance data for the climate control circuit from a climate controller of the TCCS. The remote management device is configured to provide the performance data to a plurality of user devices. The remote management device is remote from the climate controlled transport unit. The performance data is based on one or more detected operating parameters of the climate control circuit.

In an embodiment, the remote management device is configured to transmit an operating instruction to the climate controller. The operating instruction causes the climate controller to modify a predetermined operation setting of the climate controller for operating the climate control circuit.

In an embodiment, the operation instruction causes the climate controller to override a predetermined operating limit for the climate control circuit.

In an embodiment, a transport climate control system for a climate controlled transport unit includes a climate control circuit and a climate controller connected to a telematics unit. The climate control circuit configured to climate condition an internal space of the refrigerated transport unit. The climate controller configured to: control operation of the climate control circuit, detect one or more operating parameters of the climate control circuit, generate performance data for the climate control circuit based on the one or more operating parameters of the climate control circuit, and transmit performance data to a remote monitoring device. The remote monitoring device is remote from the climate controlled transport unit. The climate controller is also configured to receive an operating instruction from the remote monitoring device. The operating instruction modifies a predetermined operation setting of the climate controller for operating the TCCS.

In an embodiment, the remote monitoring system includes a remote server.

In an embodiment, the performance data includes one or more of: refrigerant superheat, refrigerant subcooling, a temperature of working fluid in a climate control circuit of the climate control circuit, a pressure of the working fluid, status of an isolation valve in the climate control circuit, amperage to a compressor in the climate control circuit, a valve position of an expansion valve in the climate control circuit, a status of a refrigerant leak safety system for the climate control circuit.

In an embodiment, the operation instruction causes the climate controller to override a predetermined operating limit of the climate controller for operating the climate control circuit.

BRIEF DESCRIPTION OF THE DRAWINGS

Both described and other features, aspects, and advantages of transport climate control systems, remote management systems for transport climate control systems, and methods of remotely managing transport climate control systems will be better understood with the following drawings.

Like reference characters refer to similar features

DETAILED DESCRIPTION

Figure 1:
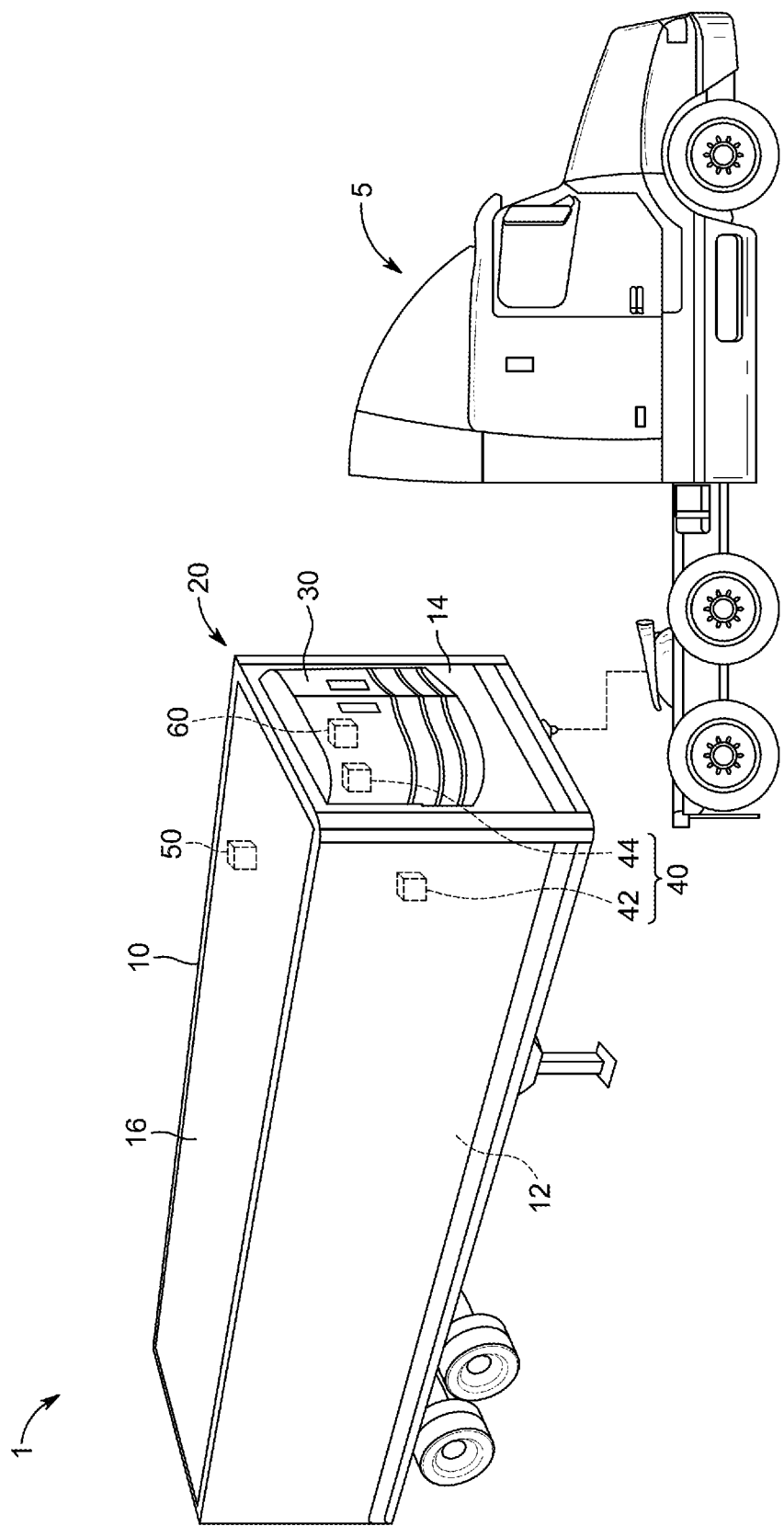
FIG. 1 is a side perspective view of a climate controller transport unit attached to a tractor.

The embodiments described herein are generally directed to a transport climate control system ("TCCS"), a remote management system for a TCCS, and a method of remotely managing a TCCS.

In the following detailed description, reference is made to the accompanying drawings, which illustrate embodiments in which the invention may be practiced. These embodiments are described in sufficient detail to enable those skilled in the art to practice what is claimed, and it is to be understood that other embodiments may be utilized without departing form the spirit and the scope of the claims. The following detailed description and the accompanying drawings, therefore, are not to be taken in a finite sense.

Different types of goods/cargo may need to be stored at specific environmental condition(s) while being stored within a transport unit. For example, perishable goods may need to be stored within a specific temperature range to prevent spoilage and liquid goods may need to be kept at a temperature above their freezing point. Also, goods having electronic components may need to be kept in environmental conditions with a lower moisture content and/or a specific temperature range to avoid damage to their electronic components. A transport climate control system may blow conditioned air into the climate controlled space of the transport unit to keep the air within the climate controlled space at the desired environmental conditions.

A TCCS can include a climate control circuit with a working fluid that can include a refrigerant. The climate control circuit has a compressor to compress the working fluid and an expansion valve to expand the working fluid. An evaporator in the climate control circuit can be used to cool air with the expanded working fluid provide cooled air to the claim controlled space of the transport unit. The refrigerant can be flammable. If a refrigerant leak occurs it can cause the surrounding environment to become dangerous (e.g., leaking flammable refrigerant making the surrounding environment flammable). The TCCS can employ safety systems that change operation of the climate control circuit when a leak is detected. Such changes can include operating the climate control circuit at a lower performance or shutting down the climate control circuit. The lowered performance and shutdown can result in, for example, the TCCS being unable keep the climate controlled space at its desired climate and damage to the goods being transported within the climate control spaced.

The embodiments described herein are generally directed to remotely managing the TCCS including the CCU. For example, a remote management device can be used to remotely manage the TCCS. The remote management device can provide performance information to one or more relevant parties (e.g., manufacturer, servicer, dispatcher, etc.). The remote management device can be configured to detect a refrigerant leak based on historical performance data (e.g., previous performance, previous testing on a similarly configured CCU, performance of other similarly configured CCUs, etc.). The remote management device can be used to adjust operating setting(s) of the TCCS based on, for example, the goods being transported. For example, the remote management device can override the safety settings of the TCCS. This can advantageously allow the TCCS to operate in a potentially damaging/dangerous manner that prevents damage to valuable goods being transported in the transport unit.

FIG. 1 illustrates one embodiment of a climate controlled transport unit 1 attached to a tractor 5. The climate controlled transport unit 1 includes a transport unit 10 and a transport climate control system ("TCCS") 20 for the transport unit 10. Dashed lines are used in FIG. 1 to illustrate features that would not be visible in the view shown. The transport unit 10 may be attached to the tractor 5 that is configured to tow the transport unit 10 to and from different locations. When not being transported, the transport unit 10 may be parked and unattached from the tractor 5. It will be appreciated that the embodiments described herein are not limited to tractor and trailer units, but can apply to any type of transport unit such as a container (e.g., a container on a flat car, an intermodal container, etc.), a truck, a box car, a commercial passenger vehicle (e.g., school bus, railway car, subway car, etc.), or other similar transport unit.

The TCCS 20 includes a climate control unit ("CCU") 30 that provides environmental control (e.g. temperature, humidity, air quality, etc.) within a climate controlled space 12 of the transport unit 10. The climate controlled space 12 is an internal space of the transport unit 10. The CCU 30 provides conditioned air into the climate controlled space 12 of the transport unit 10 to provide a desired conditioned environment for the goods being held within the climate controlled space 12 of the transport unit 10. The desired conditioned environment for the climate controlled space 12 can have one or more desired environmental conditions (e.g., temperature, humidity, air quality, etc.). For example, the CCU 30 may provide cooled air to the climate controlled space 12 when perishable goods are being kept within the transport unit 10. In another example, the CCU 30 may dehumidify the air within the climate controlled space 12 of the transport unit 10 when electronics are within the transport unit 10. The CCU 30 includes a climate control circuit (e.g., see FIG. 2, etc.) for providing conditioned air to the climate controlled space 12.

The CCU 30 is disposed on a front wall 14 of the transport unit 10. In other embodiments, it will be appreciated that the CCU 30 can be disposed, for example, on a roof 14 or another wall of the transport unit 10. The climate controlled transport unit 1 can include a battery (not shown), an internal combustion engine (not shown), or a both as a power source.

The TCCS 20 also includes a programmable climate controller 40 and one or more sensors 50. The sensor(s) 50 are configured to measure one or more parameters of the climate controlled transport unit 1 (e.g., an ambient temperature and/or ambient humidity outside of the transport unit 10, a compressor suction pressure, a compressor discharge pressure, a temperature of air supplied into the climate controlled space 12 by the CCU 30, a temperature of air returning from the climate controlled space 12 to the CCU 30, a humidity within the climate controlled space 12, etc.) and communicate parameter data to the climate controller 40. The climate controller 40 is configured to control operation of the TCCS 20 including components of the climate control circuit. The climate controller 40 may be a single integrated control unit 42 or a control unit formed by a distributed network of climate controller elements 42, 44. The number of distributed control elements in a given network can depend upon the particular application of the principles described herein.

Figure 2:
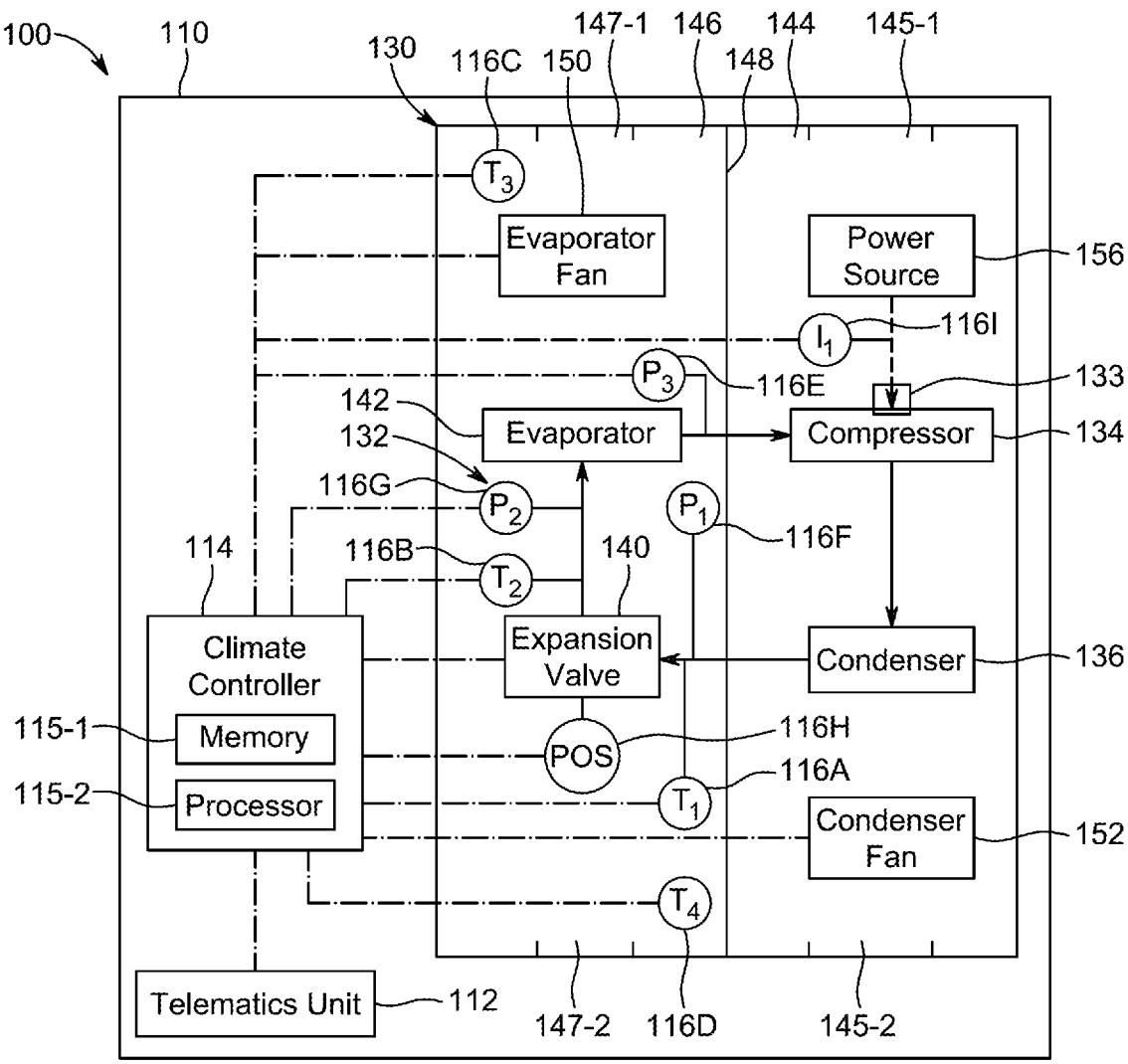
FIG. 2 is a schematic diagram of a remote management system for a transport climate control system.
Figure 2:
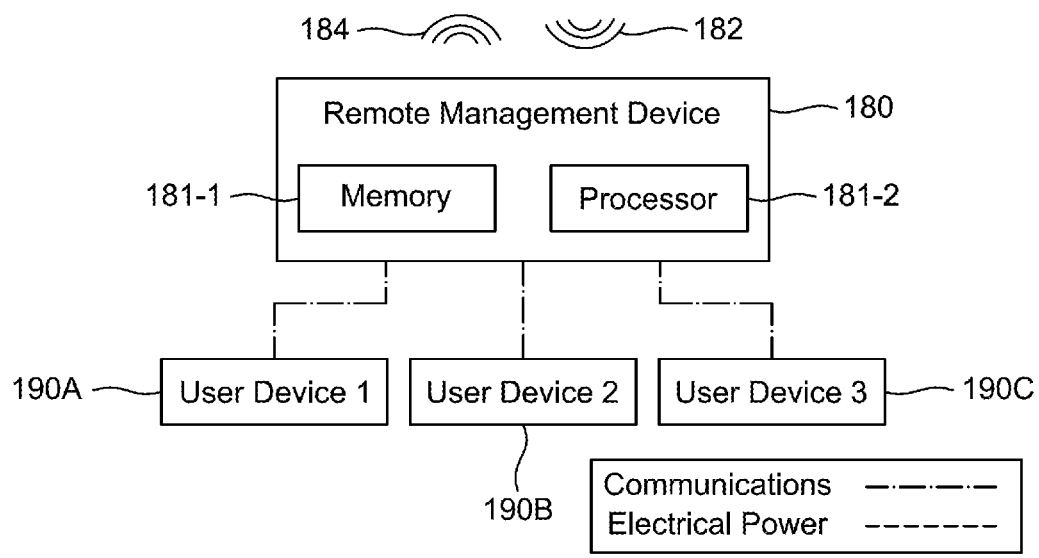

The climate controller 40 is connected to a telematics unit 60 (e.g., see FIG. 2). The telematics unit 60 allows the climate controller 114 to wirelessly communicate with a remote device (not shown) (e.g., a remote computer, a server, a server network, etc.). In the illustrated embodiment, the telematics unit 60 is separate from the climate controller 40 in the transport unit 10. In one embodiment, the telematics unit 60 may be part of the climate controller 40. In another embodiment, the telematics unit 40 may be provided on and/or in tractor 5.

FIG. 2 is a schematic diagram of a remote management system 100 for a climate controlled transport unit. The remote management system 100 is for a TCCS 110 that includes a CCU 130 with a climate control circuit 132. The CCU 130 can be utilized in a climate controlled transport unit (e.g., the refrigerated transport unit 1 of FIG. 1, etc.) to climate control an interior space of the transport unit (e.g., the interior space 12 of the transport unit 10). For example, the CCU 130 can utilize its climate control circuit 132 to provide cooling to the interior space of the transport unit.

As shown in FIG. 2, the remote management system 100 includes a remote management device 180 and a plurality of remote user devices 190A, 190B, 190C. The remote management device 180 is an electronic device remote (e.g., provided at a different location) from the refrigerated transport unit (e.g., a remote computer, a server, a server network, etc.). In an embodiment, the remote management device 180 includes a remote server. In an embodiment, the remote management device 180 and remote user devices 190A, 190B, 190C are discussed in more detail below.

The CCU 130 includes a climate control circuit 132 for providing climate control within a climate controlled space of a climate controlled transport unit. A working fluid flows through the climate control circuit 132. The working fluid includes refrigerant. In an embodiment, the working fluid includes a flammable refrigerant (e.g., refrigerants classified as A2 refrigerants or A2L refrigerants under ASHRAE Standard 34 (e.g., ASHRAE 34-2019)). The climate control circuit 132 includes a compressor 134, a condenser 136, an expansion valve 140, and an evaporator 142. The components of the climate control circuit 132 are fluidly connected to form the climate control circuit 132. The expansion valve 140 can be an electronic expansion valve that is operated by an electric motor (not shown). In an embodiment, the expansion valve 140 may be an electronic expansion and isolation valve utilized in a charge isolation system of the CCU 130. In an embodiment, the climate control circuit 132 can be modified to include additional components, such as, for example, one or more additional valve(s), sensor(s), a receiver tank, an economizer, a distributor, an accumulator tank, an overflow tank, a filter drier, or the like.

As shown in FIG. 2, the CCU 130 can include a condenser unit 144 and an evaporator unit 146 that occupy separate volumes within the CCU 130. The condenser unit 144 and the evaporator unit 146 can be separated by an internal bulkhead 148 of the CCU 130. The climate control circuit 132 extends through the bulkhead 148 and has components disposed in the condenser unit 144 and components disposed in the evaporator unit 146. For example, the condenser 136 is a heat exchanger disposed in the condenser unit 144 and the evaporator 142 is a heat exchanger disposed in the evaporator unit 146.

Ambient air from the external environment (e.g., ambient air from outside the climate controlled transport unit 1 in FIG. 1) is directed through the condenser unit 144 by entering through an ambient air inlet 145-1 and exiting through the ambient air outlet 145-2 in the condenser unit 144. The ambient air can provide ambient cooling to at least the condenser 136. The ambient air, as it flows across the condenser 136, cools the compressed working fluid separately flowing through the condenser 136.

Air is directed through the evaporator unit 146 by entering through an evaporator air inlet 147-1 and exiting through an evaporator air outlet 147-2 in the evaporator unit 146. In particular, air from the climate controlled space (e.g., the interior space 12 of the transport unit 10 in FIG. 1, etc.) enters the evaporator unit 146 through the air inlet 147-1, the air is conditioned within the evaporator unit 146 (e.g., heated, cooled, etc.), and the conditioned air is discharged from the evaporator unit 146 through the evaporator air outlet 147-2. For example, the air as it flows across the evaporator 142 is cooled by the colder expanded working fluid separately flowing through the evaporator 142.

The CCU 130 can also include one or more fans configured to direct air through one or more of the condenser unit 144, the evaporator unit 146, an internal space of the CCU 130, and/or from or to the internal space of the transport unit (e.g., internal space 12 in FIG. 1, etc.). The evaporator unit 146 can include evaporator fan(s) 150 that increases air flow through the evaporator unit 146 and into, for example, the internal space of the transport unit. The condenser unit 144 can include condenser fan(s) 152 that increases air flow through condenser unit 144 and into, for example, the ambient environment outside of the transport unit.

Operation of the CCU 130 and the climate control circuit 132 is controlled by a programmable climate controller 114. The climate controller 114 is configured to control operation of the CCU 130 and its components. In an embodiment, the climate controller 114 is a climate controller of a transport climate controller system (e.g., the climate controller 40 of the TCCS 20 in FIG. 1). For example, the climate controller 114 can be configured to control operation of the compressor 132 (e.g., control a speed of the compressor, etc.), to control operation of the electronic expansion valve 140 (e.g., operate the motor for the electric expansion valve 140 to adjust the valve position and control superheat to be within a predetermined range, etc.), etc. For example, the climate controller 114 can be configured to control airflow through the CCU 130 to discharge a desired amount of the conditioned air from the CCU 130. The climate controller 114 can be configured to control operation of fans 150, 152 and/or damper(s) (not shown) to have the desired amount of airflow through the condenser unit 144 and the evaporator unit 146.

The climate controller 114 is configured to operate fans 150, 152 of the CCU to control the flow of air through the CCU 130. The TCCS 110 can include an air management system for preventing pooling of leaked refrigerant within the CCU 130. The air management system can be implemented by the climate controller 114. In an embodiment, the climate controller 114 is configured to activate one or more fan(s) of the CCU 130 (e.g., evaporator fan 150, condenser fan 152, etc.) to mitigate pooling of leaked refrigerant within the CCU 130. For example, the climate controller 114 may be configured to periodically active the fan(s) to ventilate any dilute any leaked refrigerant from within the CCU 130 and to active the fan(s) when a refrigerant leak is detected. The air management system of the TCCS can have, for example, a normal status and an active leak mitigation status. In its normal status, the fan(s) and/or dampener(s) of the CCU 130 (e.g., evaporator fan 150, condenser fan 152, etc.) operate based on the conditioning to be provided to the climate controlled space. For example, the fan(s) and/or dampener(s) of the CCU 130 direct ambient air to provide sufficient cooling of the condenser 136 and to discharge conditioned air from the evaporator unit 146 at the desired temperature. In active leak mitigation status, the climate controller is configured to active the fan(s) and/or dampener(s) of the CCU 130 to ventilate the CCU 130 and prevent pooling of any leaked refrigerant within the CCU 130. For example, the active leak mitigation status can active due to a periodic activation that is used to dilute any potentially pooled refrigerant or in response to a detected refrigerant leak. For example, U.S. application Ser. No. 16/917,351 describes example embodiments of an air management system.

The climate control circuit 132 includes a high pressure side disposed in the condenser unit 144. The TCCS 110 can include a charge isolation system that is configured to reduce refrigerant leakage into the enclosed climate controlled space (e.g., the interior space 12 of the transport unit 10). The charge isolation system can be implemented by the climate controller 114. In an embodiment, the charge isolation system detects for a leak in the climate control circuit 132. When a leak is detected, the climate controller 114 is configured to isolate at least the high pressure side within the climate control circuit 132. For example, the climate controller 114 closes the electronic expansion valve 140 and shuts down the compressor 134 to isolate the high pressure side. For example, this limits the amount of refrigerant that can leak into the condenser unit 144 and then into the enclosed climate controlled space through the condenser unit 144. The charge isolation system can have, for example, a normal status and active isolation status. Its normal status can include monitoring of the climate control circuit for a leak in the climate control circuit. In active isolation status, the climate controller 114 isolates at least a high pressure side of the climate control circuit 132 (e.g., operates the electronic expansion valve 140 to a sealed closed position and shuts down the compressor 120, an isolation valve is closed, etc.). For example, U.S. application Ser. No. 16/917,365 describes example embodiments of a charge isolation system.

In an embodiment, the compressor 134 is a sealed compressor, such as a hermitic or semi-hermitic compressor, that includes a sealed electrical feedthrough 133 for providing electrical power to the electric motor (not shown) disposed inside the sealed compressor 134. The TCCS 110 includes a power source 156 (e.g., an engine and power generator, battery, etc.) that supplies the electrical power to the compressor 134. The CCU 130 can include a sealed compressor protection system for protecting against melting and blow-out of the electrical feedthrough 133. The sealed compressor protection system can be implemented by the climate controller 114. In an embodiment, climate controller 114 determines whether the sealed compressor is operating in a condition that can cause melting of the electrical feedthrough 113 of the sealed compressor 134. The climate controller 114 can be configured to utilizes pressure sensor 116E to detect an internal pressure $P_3$ of the compressor 134 along the inside of the electrical feedthrough 133 and/or current sensor 116I to detect an amperage $I_1$ being supplied to the through the electrical feedthrough 133. The climate controller 114 may determine whether the compressor is operating in a condition that can cause melting of the electrical feedthrough 113 based on the detected amperage $I_1$ and/or the detected pressure $P_3$. The status of the charge protection system of the CCU 130 can be, for example, a normal status and active adjustment status. In the normal status, the climate controller 114 is detecting for whether the sealed electrical feedthrough 133 is being operated in a condition that can cause melting of the sealed electrical feedthrough 133, and no adjustments are being made to normal operation of the climate control circuit 132 to avoid melting conditions of the electrical feedthrough 133. In the activated active adjustment status, the climate controller 114 is adjusting operation of the CCU 130 such that the sealed electrical feedthrough 133 is no longer operating in the conditions that can cause melting of the sealed electrical feedthrough 133. For example, U.S. application Ser. No. 16/917,374 describes example embodiments of a sealed compressor protection system.

The climate controller 114 is configured to detect various operating parameters of the CCU 130. In particular, the climate controller 114 is configured to detect one or more operating parameters of the climate control circuit 132. For example, the climate controller 114 utilizes one or more sensor(s) of the TCCS 110 (e.g.; sensors 50 in FIG. 1; temperature sensors 116A-166D, pressure sensors 116E-116G, electrical current sensor 116I, valve position sensor 116H, etc.) for detecting one or more operating parameters of the CCU 130. In an embodiment, the climate controller 114 includes memory 115-1 for storing information and a processor 115-2. The climate control circuit 114 can store detected operating parameters of the climate control circuit in its memory. The climate controller 114 is shown in FIG. 2 as a single integrated control unit. However, it will be appreciated that the climate controller 114 in an embodiment may a single integrated control unit or a distributed network of climate controller elements (e.g., distributed network of climate controller elements 42, 44 in FIG. 1, etc.).

Operating parameters are parameters of the CCU 130 and its components that can vary over time with operation and the performance of the CCU 130 (e.g., amount of conditioning being provided by the CCU 130, refrigerant charge in the climate control circuit 132, ambient air temperature, speed of the compressor 134, etc.). Operating parameters of the CCU can include measurements of, for example but not limited to, temperatures (e.g., working fluid temperature, air temperature, etc.) voltages, electric currents, flow rates (e.g., air flow rate, working fluid flow rate, etc.), a valve position, etc. in the CCU 130. The operating parameters may be detected directly with sensors or indirectly based on a different detected operating parameter (e.g., a discharge pressure of the compressor 134 determined based on the suction pressure and the speed of the compressor 134, etc. As shown in the illustrated embodiment, the CCU 130 can include one or more temperature sensor(s) 116A, 116B for detecting temperature(s) $T_1$, $T_2$ of the working fluid in the climate control circuit 132, temperature sensor(s) 116C, 116D for detecting air temperatures $T_3$, $T_4$, pressure sensors 116F-G for detecting pressure(s) $P_1$, $P_2$, $P_3$ of the working fluid in the climate control circuit 132, position sensor 116H for detecting the valve position POS of the electronic expansion valve 140, and/or current sensor 116I for detecting the amperage $I_1$ of the electrical power supplied to the compressor 134. Temperature sensor 116A and pressure sensor 116F respectively detect the temperature $T_1$ and the pressure $P_1$ of the working fluid entering the expansion valve 140. Temperature sensor 116B and pressure sensor respectively detect the temperature $T_2$ and the pressure $P_2$ of the working fluid discharged from the expansion valve 140. Pressure sensor 116E detects the suction pressure $P_3$ of the compressor 134. Temperature sensor 116C detects the return air temperature $T_3$. Temperature sensor 116D detects the outlet air temperature $T_4$ of the CCU 130 (e.g., temperature of the air after being cooled by the climate control circuit 132, etc.). Electrical current sensor 116I detects the amperage $I_1$ of the electrical current supplied to the compressor 134. In other embodiments, the TCCS 110 and the CCU 130 may include a different number and/or configuration of sensor(s) than the sensors 116A-I in FIG. 2. For example, the TCCS 110 in an embodiment may include a temperature disposed in the climate controlled space (e.g., sensor 50 in climate controlled space 12 in FIG. 1, etc.). In an embodiment, the TCCS 110 may have utilize multiple sensors to confirm a single temperature (e.g., multiple sensors for detecting a temperature of the climate controlled space 12 in FIG. 1). In an embodiment, the climate controlled space of the transport unit (e.g., climate controlled space 12 in FIG. 1, etc.) may have multiple temperature zones, and the TCCS 110 may include one or more temperature sensor(s) for detecting the temperature of each temperature zone.

The climate controller 114 operates the TCCS 110, including its CCU 130, according to operation settings stored in the memory 115-1 of the climate controller 114. The operation settings can include, for example, the desired temperature or temperature range for the conditioned space of the CCTU (e.g., desired temperature for goods transported in the climate controlled space 12 of the CCTU 1 in FIG. 1, etc.), a desired superheat limit or range for the working fluid, etc. The climate controller 114 operates the CCU 110 to provide conditioned air (e.g., cooled air, heated air, etc.) such that the conditioned space remains within the desired temperature range. The operating settings can include protocols for implementing the refrigerant leak protection system(s) for the CCU 130 (e.g., the sealed compressor protection system, the charge isolation system, etc.). In particular, the operating settings of the climate controller 114 can include the operating limit(s) at which the protection systems are become active (e.g., go from normal status to activated status, etc.). A protection system becomes activate when operation of the CCU 130 passes an operating limit of the protection system (e.g., an operating parameter of the CCU exceeds a predetermined minimum threshold, an operating parameter of the CCU becomes less than a predetermined threshold, etc.). The operating limit(s) for the protection systems are stored in the memory 115-1 of the climate controller 114.

For example, operating limit(s) of the sealed compressor protection system can include a predetermined amperage draw limit for the sealed electrical feedthrough 133 and/or a predetermined suction pressure threshold. The sealed compressor protection system can become active when the compressor amperage $I_1$ exceeds the predetermined amperage draw limit or when the suction pressure $P_3$ falls below the predetermined suction pressure threshold. For example, activation parameter(s) of the charge isolation system can include a predetermined threshold for comparing expected and actual performance of the climate control circuit 132 (e.g., a predetermined step amount for comparing expected and actual position of the expansion valve 140, predetermined limit for trend in variance of the expected and the actual positions of the electronic expansion valve 140, a predetermined temperature amount for comparing expected and actual temperature of the working fluid, etc.). The charge isolation system can become active when the difference between an expected performance/parameter and the actual performance/parameter of the CCU (e.g., temperature $T_2$, valve position POS, etc.) exceeds a predetermined temperature threshold or limit.

In an embodiment, the climate controller 114 may determine whether a leak exists based on the valve positon POS of the electric expansion valve 140 and refrigerant superheat. The climate controller 114 may utilize position sensor 116H to detect the valve position POS of the electronic expansion valve 140 (e.g., the specific degree that the electronic expansion valve 140 is open). For example, the position sensor 116H may detect a step positon of a stepper motor (not shown) that drives the electronic expansion valve 140, and as the step position varies correspondingly with valve position POS, the climate controller may use the step position for the valve position POS. The climate controller 130 can utilize temperature sensor 116B and pressure sensor 116G to detect the pressure $P_2$ and temperature $T_2$ of the working fluid discharged from the expansion valve 140 to determine refrigerant superheat. A leak can be detected by comparing an expected superheat based on the detected valve position or an expected valve positon based on the detected superheat to their actual detected measurement.

The climate controller 114 is configured to generate performance data for the CCU 130 based on the detected operating parameters. In particular, the performance data is for the climate control circuit 132 of the CCU 130 The performance data includes detected operating parameter(s) and/or performance information for climate control circuit 132 based on the detected operating parameter(s). In an embodiment, the performance data includes at least one or more of the detected operating parameter(s) of the CCU 130. The performance information for the CCU 130 is based on the detected operating parameter(s). For example, the performance data can include refrigerant superheat, refrigerant subcooling, the status of the charge isolation system, the status of an air management system, the status of the sealed compressor protection system, etc. In an embodiment, performance data includes one or more of refrigerant superheat, detected working fluid temperature (e.g., temperature $T_1$, temperature $T_2$, etc.), detected working fluid pressure (e.g., pressure $P_1$, pressure $P_2$, pressure $P_3$, etc.), detected air temperature (e.g., temperature $T_3$, temperature $T_4$), detected electrical amperage (e.g., compressor power supplied amperage $I_1$, etc.), detected expansion valve position (e.g., valve position POS, etc.), a protection system status for the CCU (e.g., status of air management system, status of compression protection system, status of charge isolation system, etc.).

The climate controller 114 is connected to the telematics unit 112 and is able to utilize the telematics unit 112 to communicate with the remote management device 180. The climate controller 114 can utilize the telematics unit 112 to wirelessly communicate with the remote management device 180 (e.g., while parked, during transport, in storage, etc.). In some embodiments, while parked, the telematics unit 112 may be plugged into a local network (e.g., local power facility, a pick-up facility, a drop-off facility, etc.) that can allow the climate controller 114 to communicate with the remote management device 180 via a physical wired connection and/or a standby power line communication. The climate controller 114 is configured to wirelessly transmit the performance data 182 to the remote management device 180. The remote management device 180 includes a memory 181-1 for storing data (e.g., the performance data 182, etc.) and a processor 181-2. In an embodiment, the remote management device 180 can be part of a cloud based computing system. For example, the remote management device 180 formed by one or more cloud server(s) (e.g., a remote server that accesses a cloud database, etc.). Processor 181-2 of the remote management device 181 can be formed by a cloud processing server that accesses the memory 181-1 formed in cloud data server (e.g., remote management device is a server that accesses a cloud database). It will be appreciated that in some embodiments, the climate controller 114 can communicate, via for example the telematics unit 112, with a local network server (not shown) or a dedicated server for the fleet of CCTUs.

The remote management device 180 stores the performance data 182 received from the TCCS 110. In an embodiment, the remote management device 180 may communicate with a plurality of the TCCS(s). For example, the remote management device 180 can be used for managing a fleet of CCTUs (e.g., the CCTU 1 in FIG. 1, etc.) that each have a respective TCCS. Each of the CCTUs can be configured to wirelessly report performance data as similarly discussed above for the TCCS in FIG. 2. The remote management device 180 can store the performance data for the TCCs in its memory. In an embodiment, the remote management device 180 may be configured average the performance data for each type of TCCS (e.g., model, configuration of TCCS, etc.) and store the average performance for each type of TCCS in its memory.

The remote management device 180 can be configured to analyze the performance data 182. For example, the remote management device 180 compares the performance data 182 to historical performance data for the TCCS 110. The historical performance data can be stored in the memory 181-1 of the remote management device 180. For example, the historical performance data may be performance data previously received from the TCCS 110, testing data for the TCCS 110 (e.g., testing data for a model/configuration of the TCCS 110, etc.), performance data for other comparable TCCS (e.g., performance data received from other TCCS(s) that have a similar configuration to the TCCS 110, average performance data for TCCS(s) with a similar model/configuration to the TCCS 110, etc.). In an embodiment, the performance data 182 may be analyzed to detect for a refrigerant leak in the climate control circuit 132. For example, a refrigerant leak decreases a charge of the refrigerant and can affect the amount of climate control provided by the CCU in a particular configuration.

In an embodiment, the remote management device 180 is configured to wirelessly transmit an operation instruction 184 to climate controller 114 via the telematics unit 112. The operation instruction 184 modifies one or more predetermined operation settings for the climate controller 114 to operate the TCCS 110. The operation instruction 184 causes the climate controller 114 to modify one or more operation settings stored in its memory 115-1. For example, the operation instruction 184 can cause the processor 115-2 to modify operation setting(s) stored in the memory 115-1 for operating the climate control circuit 132. The operation instruction 184 can cause the climate controller 114 to override one or more of its operation settings for operating the CCU. The operation instruction 184 can cause the climate controller 114 to override one or more of the predetermined operating limits stored in the memory 115-1. For example, the climate controller 114 may be configured to override a predetermined operating limit by adjusting the predetermined operating limit (e.g., increasing the value of an operating limit that is a maximum threshold or limit, decreasing the value of an operating limit that is a minimum threshold or limit, etc.) or by ignoring the operating limit. This modification allows the CCU 130 to operate in unsafe conditions.

The remote management device 180 is configured to communicate with (e.g., wired connection, wireless connection, etc.) one or more user devices 190A-190C. A user device 190A, 190B, 190C is an electronic device (e.g., a computer, tablet, cellphone, etc.) that allows for a user to access the remote management device 180. In an embodiment, the user device 190A and remote management device 180 are in the form of a computer used by a user to access a cloud-based server. Users can include, for example, an engineer/manufacture of the TCCS 130, a servicer of the TCCS 130, and/or a dispatcher of the CCTU (e.g., the CCTU in FIG. 1, etc.). The dispatcher of the CCTU may also be referred to as a dispatcher. For example, the remote management device is configured to communicate with a first user device 190A that is for an engineer/manufacturer of the TCCS 130, a second user device 190B that is a technician that services the TCCS 130, and a third user device 190C is a dispatcher is directing operation of the CCTU to transport goods.

In an embodiment, the operation instruction 184 is transmitted based on operation input from the first user device 190A. For example, the operation input can be a request from the first user device 190A for the modification of operating settings of the CCU 130 (e.g., a dispatcher's request to override the operating limits of the CCU, a dispatcher's request to disable the operating limits of the CCU). For example, the operation input can be cargo value information for the CCTU. Cargo value information describes value(s) for the goods transported by the CCTU (e.g., price of the goods, delivery criticality, etc.) In an embodiment, user device 190C provides cargo value information to the remote management device 180, and the remote management device 180 determines whether to transmit the operation instruction 184 based on the cargo value information. The remote management device 180 transmits the operation instruction 184 that overrides the operating limit(s) when the value of the cargo is greater than a predetermined value (e.g., price of the cargo is greater than a predetermined price, delivery criticality is above a predetermined limit, etc.).

In some situations, the TCCS may be transporting higher value cargo (e.g., goods with a higher price, goods with a critical delivery need) that are temperature sensitive. In such situations, potentially damaging operation (e.g., operating with a flammable refrigerant leak, operating with a higher risk of damaging the components of the CCU, etc.) is outweighed by the potential of damaging the goods. For example, predetermined operational limits are put in place to prevent the equipment of the TCCS from operating in a manner that will likely lead to damaging equipment of the TCCS. The remote management system 100 can advantageously allow the dispatcher of the CCTU to remotely override the normal protection limits of the CCU to reduce the risk of damaging the costly or critical value goods while being transported in the CCTU. In some embodiments, the dispatcher provides the value information to the remote management system 100 (e.g., price of the goods, criticality of the goods, bill of lading, etc.) and the remote management system 100 can be configured to advantageously automatically override the normal protection limits when appropriate (e.g., the goods are more expensive, the goods are a critical delivery, etc.).

The remote management device 180 can provide the user device(s) 190A, 190B, 190C with the data of the remote management device 180 (e.g., the data stored in the memory 181-1 of the remote management device 180, etc.). In an embodiment, the remote management device 180 can be configured to provide different access to the user device(s) 190A, 190B, 190C based on an access level designated for the user. That is, the remote management device 180 can have a plurality of access levels for accessing the remote management device 180. The remote management device 180 can provide access to each user device 190A, 190B, 190C based on the access level of the user device 190A, 190B, 190C. The remote management device 180 can be configured to provide all or some of the performance data for the TCCS 110 to each user device 190A, 190B, 190C differently based on the access level of the user device 190A, 190B, 190C.

In an embodiment, the remote management system can include a first access level, a second access level, and a third access level. For example, the remote management device 180 can have a first access level for engineer user device(s) (e.g., first user device 190A, etc.), a second access level for technician user device(s) (e.g., second user device 190B, etc.), and a third access level for dispatcher user device(s) (e.g., third user device 190C, etc.). Accordingly, the remote management device 180 can provide the first user device 190A with engineer level access (e.g., allows access at the first access level to the data for the TCCS 110 stored in the remote management device 180), can provide the second user device 190B with technician level access (e.g., allows access at the second access level to the data stored in the remote management device 180), and can provide the third user device 190C with dispatcher level access (e.g., allows access at the third access level to the data stored in the remote management device 180).

The first access level can be a highest level of access (e.g., provides the most access to the data stored in the remote management device 180). The first access level can allow for full access of the remote management device 180 (e.g., access to all of the data stored in the remote management device 180). The second access level can allow access to the performance data for the CCU 130 that is stored in the remote management device 180. The third access level can allow the user device 190C to remotely modify the operation parameter(s) of the CCU 130 as discussed above (e.g., provide a request or value information that causes the remote management device 180 to instruct the climate controller 114 to override the operating limits for operating the CCU 130). The remote management system 100 can be configured to only provide data to a servicer's user device 190B that relates to servicing of the TCCS 110 and only provide data to the dispatcher's user device 190A that relates to the overall operation of CCU 130.

In an embodiment, the first access level can have full access to the remote management device 180, while the second access level and the third access level can have limited access to the remote management device 180. For example, the second access level may not permit remote modification of the operation settings of the climate controller 114. The servicer may not be allowed to utilize the remote modification of remote management device 180 (e.g., the servicer allowed performance data access but not the access for making remote modifications). For example, the third access level may have limited access to the performance data, such as only permitting access to the stored data for the overall performance of the CCU (e.g., climate controlled space internal temperature, return air temperature $T_3$, conditioned air discharged temperature $T_4$, ambient air temperature, compressor speed, battery level, etc.).

The illustrated embodiment in FIG. 2 includes three remote user devices 190A-190C. It should be appreciated that the remote management device 180 in an embodiment may utilize a different number of remote user devices. In an embodiment, the remote management device 180 may utilize two or more user devices. In an embodiment, the remote management device 180 may utilize more than three user devices. In such embodiments, the remote management device 180 may have an access level for each user device (e.g., an access level for each type of user/user device, etc.). For example, the remote management device 180 in various embodiments may have two access levels or more than three access levels.

Figure 3:
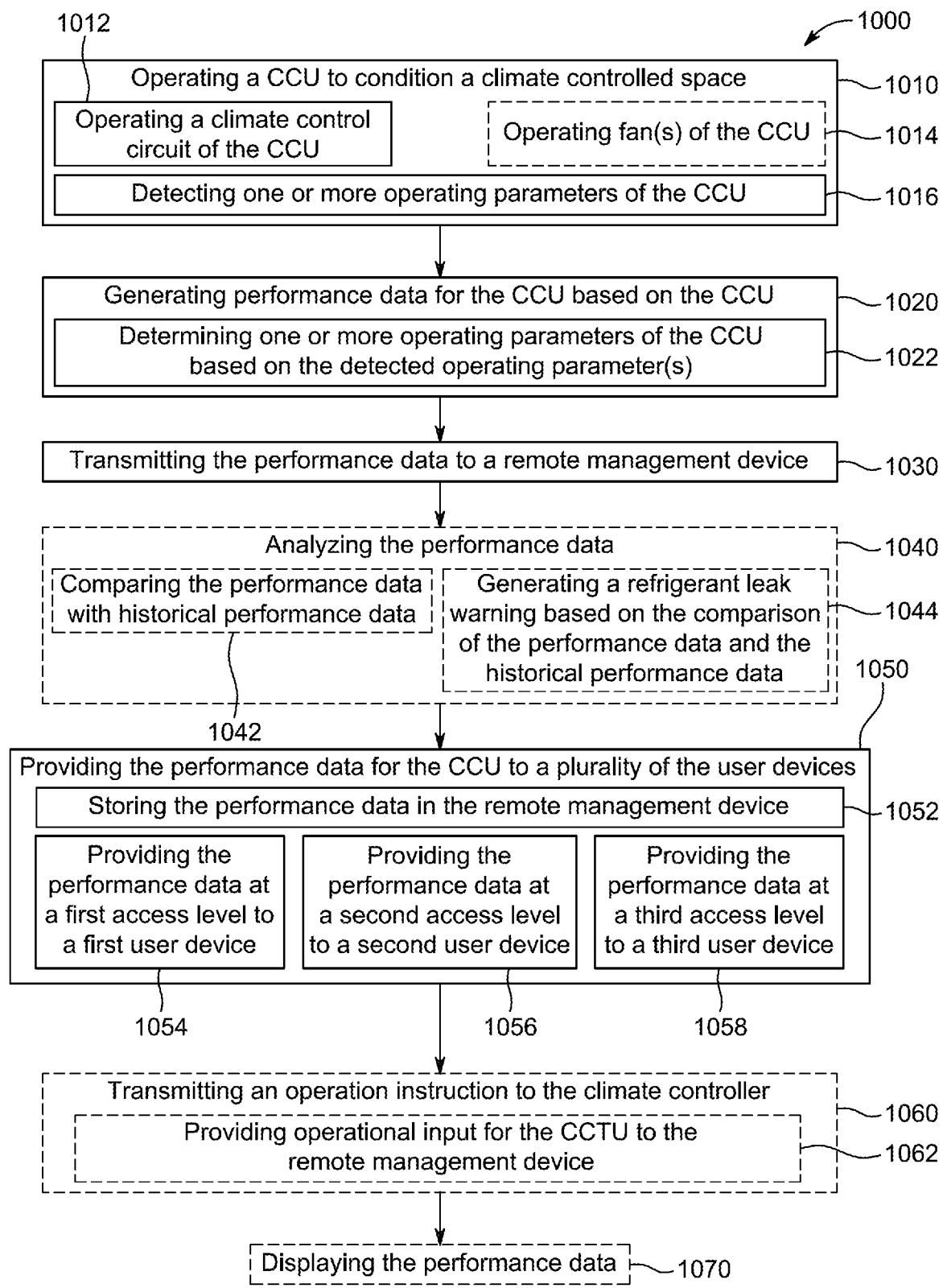
FIG. 3 is a block flow diagram of a method of remotely managing a transport climate control system.

FIG. 3 is a flow chart for a method 1000 of remotely managing a TCCS. In an embodiment, the method 1000 may be employed, for example, to remotely manage the TCCS 20 of the CCTU 1 in FIG. 1 (e.g., employed by the climate controller 40, etc.) and as described above. In an embodiment, the method 1000 may be employed, for example, by the remote management system 100 in FIG. 2. For example, the remote management device 180, the user devices 190A-190C, and the climate controller 114 of the remote management system 100 may employ the method 1000. The method 1000 starts at 1010.

At 1010, a climate controller of the TCCS (e.g., climate controller 40, climate controller 114) operates a CCU (e.g., CCU 30, CCU 130) to condition a climate controlled space (e.g., climate controlled space 12). In an embodiment, the climate controlled space is the climate controlled space of a transport unit (e.g., climate controlled space 12 of the transport unit 10). The CCU includes a climate control circuit (e.g., climate control circuit 132) for providing cooling to the climate controlled space. The CCU can also include one or more fan(s) (e.g., evaporator fan 150, condenser fan 152) for directing air through the CCU. Operating the CCU 1010 can include operating the climate control circuit 1012 and operating the fan(s) 1014. The climate controlled circuit includes a compressor (e.g., compressor 134), a condenser (e.g., condenser 136), an expansion valve (e.g., expansion valve 140), and an evaporator (e.g., evaporator 142).

Operating the CCU 1010 can also include detecting operating parameter(s) of the CCU 1060 (e.g., working fluid temperature $T_1$, working fluid temperature $T_2$, ambient air temperature $T_3$, discharged conditioned air temperature $T_4$, working fluid pressure $P_1$, working fluid pressure $P_2$, compressor suction pressure $P_3$, valve position POS, amperage $I_1$). For example, the climate controller utilizes one or more sensors of the TCCS (e.g., sensor(s) 50, sensors 116A-116I, etc.) to detect the operating parameter(s) of the CCU.

In an embodiment, the expansion valve of the climate control circuit can be an electronic expansion valve. In such an embodiment, operating the climate control circuit 1012 can include, for example, the climate controller determining superheat of the working fluid based on the detected operating parameters, and operating the electronic expansion valve based on the determined superheat of the working fluid. The method 1000 than proceeds from 1010 to 1020.

At 1020, the climate controller generates performance data for the CCU. The performance data can include one or more of the operating parameters detected at 1016. Generating the performance data 1020 can include determining one or more operating parameters of the CCU based on the detected operating parameters 1022. For example, the determining operating parameter(s) at 1022 can include determining refrigerant superheat based on a working fluid pressure and temperature detected at 1016 (e.g., temperature $T_2$ and pressure $P_2$) and/or determining refrigerant subcooling based on a working fluid pressure and temperature detected at 1016 (e.g., temperature $T_1$, pressure $P_1$). For example, determining parameter(s) at 1022 can be detecting an operating condition indirectly (e.g., determining discharge pressure of the compressor 134 based on a detected suction pressure $P_3$ and a speed of the compressor, etc.). The climate controller generating the performance data 1020 can include storing the detected performance conditions in a memory of the climate controller (e.g., memory 115-1). The method 1000 then proceeds to 1030.

At 1030, the climate controller transmits the performance data (e.g., performance data 182) to a remote management device (e.g., remote management device 180). The performance data is transmitted via a telematics unit of the CCTU (e.g., telematics unit 1020). The telematics unit may be part of the climate controller or a separate device connected to the climate controller. The remote management device being at a remotely located from the CCTU. The method then proceeds to 1040.

At 1040, the remote management device can analyze the performance data of the CCU. The analysis can include comparing the performance data with historical performance data stored in the remote management device at 1042. For example, the historical performance data can be stored in a memory of the remote management device (e.g., memory 181-1 of the remote management device 180). As discussed above, the memory 181-1 can be formed by a cloud server. The historical data may be stored in a cloud database (e.g., the memory being a cloud data server). The analysis 1040 can also include the remote management device generating a refrigerant leak warning for the TCCS at 1044. For example, the remote management device transmits the refrigerant leak warning to the climate controller via the telematics unit. The remote management device determines whether to generate the leak warning at 1044 based on the comparison of the performance data and the historical performance data.

The analysis of the performance data at 1040 (including 1042 and 1044) can be optional. The remote management device in some embodiments may not perform the analysis at 1040. In such embodiments, the method 1000 may not include the analysis at 1040 and proceed from 1030 directly to 1050. The method 1000 then proceeds to 1050.

At 1050, the remote management device provides the performance data to user devices (e.g., 190A-190B). The user devices can also be remote from the CCTU. The remote management device may provide the performance data to the user devices through a wired and/or a wireless connection. Providing the performance data to the user devices at 1050 can include storing the performance data received from the climate controller in the remote management device at 1052 and then providing the performance data stored in the remote management device to the user devices at 1054, 1056 and 1058. For example, the performance data is stored in the memory of the remote management device. As discussed above, the memory of the remote management device can be formed by a cloud server (e.g., the memory being a cloud data server). In such an embodiment, the performance data stored at 1052 is stored in a cloud database.

Providing the performance data to the user devices at 1050 can also include the remote management device providing the performance data at a first access level to a first user device 1054 (e.g., first user device 190A), the remote management device providing the performance data at a second access level to a second user device 1054 (e.g., second user device 190B), and remote management device providing the providing the performance data at a third access level to a third user device 1054 (e.g., third user device 190C). In an embodiment, providing the performance data to a user device at 1054, 1056, and/or 1058 can be the remote management device allowing the respective user device to access the performance data stored in the memory of the remote management device at the specific access level. For example, the access level specified for a user device can determine how much of the performance data is accessible by said user device. The method 1000 then proceeds from 1050 to 1060.

At 1060, the remote management device transmits an operation instruction to the climate controller (e.g., operation instruction 184). The operation instruction can be transmitted from the remote management device to the climate controller via the telematics unit. In an embodiment, the operation instruction can cause the climate controller to modify one or more predetermined operation settings stored in its memory (e.g., predetermined operation settings stored in the memory 115-1 for operating the CCU). For example, the operation instruction can cause a processor of the climate controller (e.g., processor 115-2 of the climate controller 114) to modify the operation setting(s) stored in the memory for operating the climate control circuit. In an embodiment, the modification of the operation setting(s) can cause the climate controller to override an operating limit for the CCU. For example, the operating limit can restrict operation of one of the components of the climate control circuit. The operating instruction may cause the climate controller to ignore a predetermined shutdown parameter for operating the compressor of the CCU.

In an embodiment, the operation instruction is transmitted based on operational input provided from a dispatcher's user device (e.g., user device 190C) at 1062. The operational input can include, for example, cargo value information and/or a request from the dispatcher's user device. For example, transmitting the operating instruction at 1060 can include the user device providing cargo value information for the CCTU to the remote management device 1062. For example, transmitting the operation instruction at 1060 can include the user device providing a request to remotely adjust the operational setting(s) for the CCU. In an embodiment, the load value information may include cargo value information as described above, and the method at 1060 can include the determining whether to transmit the operational instruction based on the cargo value information. The method 1000 can then proceed to 1070.

At 1070, the performance data is displayed to the user(s). For example, the performance data provided to the user devices at 1050 is displayed to the user(s). A screen of each user device can visually display the user data to its user. For example, displaying the performance data at 1070 can include a first user display (e.g., first user device 190A) visually displaying the user data provided at 1054 to an engineer of the TCCS 130, a second user device (e.g., second user device 190B) visually displaying the performance data provided at 1056 to a technician that services the TCCS 130, and/or a third user device (e.g., third user device 190C) displaying the performance data provided at 1058 to an dispatcher that is directing operation of the CCTU to transport goods.

In an embodiment, analysis of the performance data at 1040 (including 1042 and 1044) can be performed by one of the user devices (e.g., the dispatcher's user device 190C, etc.). For example, 1070 may include the analysis of the performance data at 1040. In such an embodiment, the historical data may be stored on said user device (e.g., a memory of the dispatcher's user device 190C) or a local server connected to said user device (e.g., memory of a local server connected to the dispatcher's user device). When the analysis by the user device determines there is a refrigerant leak based on the performance data, the user device can send a refrigerant leak warning to the remote management device which then relays the refrigerant leak warning to the climate controller of the TCCS.

In some embodiments, the features of method 1000 may occur in a different order and/or concurrently than shown in the embodiment of FIG. 3. For example, the analyzing the performance data at 1040 may occur after or concurrently with providing the performance data to the user device(s) at 1050. For example, the display the performance data at 1070 may occur before transmitting the operation instruction at 1060.

It should be appreciated that the method 1000 may be modified to incorporate features as discussed above for the remote management system 100. For example, operating the CCU at 1010 in an embodiment can include the climate controller being configured to implement one or more of refrigerant leak protection systems as discussed above (e.g., the sealed compressor protection system, the charge isolation system, the air management system, etc.).

ASPECTS

Any of aspects 1-14 can be combined with any of aspects 15-22, and any of aspects 15-17 can be combined with any of aspects 18-22.

Aspect 1. A method of remotely managing a transport climate control system (TCCS) of a climate controlled transport unit, the TCCS includes a climate control circuit for conditioning a climate controlled space of the climate controlled transport unit, the method comprising: a remote management device receiving performance data for the climate control circuit from a climate controller of the TCCS, the performance data generated by the climate controller based on one or more detected operating parameters of the climate control circuit, the remote management device being remote from the climate controlled transport unit; and providing, via the remote management device, the performance data to a plurality of user devices.

Aspect 2. The method of Aspect 1, wherein the remote management device includes a remote server.

Aspect 3. The method of any one of Aspects 1 and 2, further comprising: comparing, with the remote management device, the performance data for the climate control circuit to historical performance data for the climate control circuit; and generating a refrigerant leak warning based on the comparison of the performance data and the historical performance data.

Aspect 4. The method of any one of Aspects 1-3, further comprising: the remote management device transmitting the refrigerant leak warning to the climate controller via the telematics unit.

Aspect 5. The method of any one of Aspects 1-4, wherein the performance data includes one or more of: refrigerant superheat, refrigerant subcooling, a temperature of working fluid in the climate control circuit, a pressure of the working fluid, status of an isolation valve in the climate control circuit, amperage to a compressor in the climate control circuit, a valve position of an expansion value in the climate control circuit, a status of a refrigerant leak protection system of the climate control circuit.

Aspect 6. The method of any one of Aspects 1-5, wherein the one or more operating parameters of the climate control circuit include one or more of: a temperature of working fluid in the climate control circuit, status of an isolation valve in the climate control circuit, amperage to a compressor in the climate control circuit, a pressure of the working fluid, and a valve position of an expansion valve in the climate control circuit.

Aspect 7. The method of any one of Aspects 1-6, further comprising: the remote management device transmitting an operating instruction to the climate controller via the telematics unit, the operating instruction modifying a predetermined operation setting of the climate controller for operating the climate control circuits.

Aspect 8. The method of Aspect 7, wherein the predetermined operation setting is stored in a memory of the climate controller, the operating instruction causing the climate controller to override the predetermined operation setting.

Aspect 9. The method of any one of Aspects 7 and 8, wherein the operation instruction causes the climate controller to override a predetermined operating limit for the climate control circuit.

Aspect 10. The method of any one of Aspects 9, wherein climate controller overrides the predetermined operating limit by adjusting or ignoring the predetermined operating limit.

Aspect 11. The method of any one of Aspects 7-10, wherein the operating instruction causes the climate controller to ignore a predetermined shutdown parameter for operating a compressor of the climate control circuit.

Aspect 12. The method of any one of Aspects 7-11, wherein the plurality of user devices includes a first user device, the method further comprising: the first user device providing operation input for the CCTU to the remote management device, the operation input causing the remote management device to perform the transmitting of the operating instruction.

Aspect 13. The method of any one of Aspects 7-12, wherein the operation input is goods values information for the CCTU; and the remote management device generating the operating instructions based on the goods information.

Aspect 14. The method of any one of Aspects 7-12, further comprising: storing the performance data in a memory of the remote monitoring device, wherein the plurality of user devices includes a first user device and a second user device, and the providing of the performance data to the plurality of user devices includes: providing the first user device with the performance data stored on the remote management device at a first access level, and providing the second user device with the performance data stored in the remote management device at a second access level, the second access level limiting access to the performance data relative to the first access level.

Aspect 15. A remote management system for a transport climate control system (TCCS) of a climate controlled transport unit, the TCCS including a climate control circuit for conditioning an internal space of the refrigerated transport unit, the remote management system comprising:
  a remote management device configured to receive performance data for the climate control circuit from a climate controller of the TCCS, the remote management device being remote from the climate controlled transport unit, the performance data based on one or more detected operating parameters of the climate control circuit, and the remote management device configured to provide the performance data to a plurality of user devices.

Aspect 16. The remote management system of Aspect 15, wherein the remote management device is configured to transmit an operating instruction to the climate controller, the operating instruction causing the climate controller to modify a predetermined operation setting of the climate controller for operating the climate control circuit.

Aspect 17. The remote management system of any one of Aspects 15 and 16, wherein the operation instruction causes the climate controller to override a predetermined operating limit for the climate control circuit.

Aspect 18. A transport climate control system (TCCS) for a climate controlled transport unit, comprising: a climate control circuit configured to climate condition an internal space of the refrigerated transport unit; a climate controller connected to a telematics unit, the climate controller configured to: control operation of the climate control circuit, detect one or more operating parameters of the climate control circuit, generate performance data for the climate control circuit based on the one or more operating parameters of the climate control circuit, and transmit performance data to a remote monitoring device, that is remote from the climate controlled transport unit, via the telematics unit, wherein the climate controller is configured to receive, via the telematics unit, an operating instruction from the remote monitoring device, the operating instruction modifying a predetermined operation setting of the climate controller for operating the TCCS.

Aspect 19. The TCCS of Aspect 18, wherein the remote monitoring system includes a remote server.

Aspect 20. The TCCS of any one of Aspects 18 and 19, wherein the performance data includes one or more of: refrigerant superheat, refrigerant subcooling, a temperature of working fluid in the climate control circuit, a pressure of the working fluid, status of an isolation valve in the climate control circuit, amperage to a compressor in the climate control circuit, a valve position of an expansion valve in the climate control circuit, a status of a refrigerant leak protection system for the climate control circuit.

Aspect 21. The TCCS of any one of Aspects 18-20, wherein the one or more operating parameters of the climate control circuit include one or more of: a temperature of working fluid in the climate control circuit, a pressure of the working fluid, status of an isolation valve in the climate control circuit, amperage to a compressor in the climate control circuit, and a valve position of an expansion valve in the climate control circuit.

Aspect 22. The TCCS of any one of Aspects 18-21, wherein the operation instruction causes the climate controller to override a predetermined operating limit of the climate controller for operating the climate control circuit.

Aspect 23. The TCCS of any one of Aspects 18-22, wherein the operating instruction includes a refrigerant leak warning.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method of remotely managing a transport climate control system (TCCS) of a climate controlled transport unit, the TCCS includes a climate control circuit for conditioning a climate controlled space of the climate controlled transport unit, the climate control circuit containing refrigerant, the method comprising:
  a remote management device receiving performance data for the climate control circuit from a climate controller of the TCCS, the performance data generated by the climate controller based on one or more detected operating parameters of the climate control circuit, the remote management device being remote from the climate controlled transport unit;
comparing, with the remote management device, the performance data for the climate control circuit to average performance for a model of TCCS matching the TCCS of the climate controlled transport unit,
generating, by the remote management device, a refrigerant leak warning based on the comparison of the performance data and the average performance for a type of TCCS matching the TCCS of the climate controlled transport unit, and
transmitting, by the remote management device, the refrigerant leak warning to the climate controller.

2. The method of claim 1, wherein the remote management device includes a remote server.

3. The method of claim 1, wherein the performance data includes one or more of: refrigerant superheat, refrigerant subcooling, a temperature of working fluid in the climate control circuit, a pressure of the working fluid, status of an isolation valve in the climate control circuit, amperage to a compressor in the climate control circuit, a valve position of an expansion valve in the climate control circuit, a status of a refrigerant leak protection system of the climate control circuit.

4. The method of claim 1, wherein the one or more operating parameters of the climate control circuit include one or more of: a temperature of working fluid in the climate control circuit, a pressure of the working fluid, status of an isolation valve in the climate control circuit, amperage to a compressor in the climate control circuit, and a valve position of an expansion valve in the climate control circuit.

5. The method of claim 1, further comprising:
storing the performance data in a memory of the remote management device; and
providing, via the remote management device, the performance data to a plurality of user devices, wherein the providing of the performance data to the plurality of user devices includes:
providing a first user device of the plurality of user devices with the performance data stored on the remote management device at a first access level, and
providing a second user device of the plurality of user devices with the performance data stored in the remote management device at a second access level, the second access level limiting access to the performance data relative to the first access level.

6. The method of claim 1, further comprising:
transmitting, by the remote management device, an operating instruction to the climate controller, the operating instruction causing the climate controller to override a refrigerant leak protection system of the climate controlled transport unit.

7. The method of claim 6, wherein the operating instruction modifies a predetermined operation setting of the climate controller for operating the climate control circuit.

8. The method of claim 6, wherein the operating instruction causes the climate controller to override a predetermined operating limit for activating the refrigerant leak protection system.

9. The method of claim 8, wherein the climate controller overrides the predetermined operating limit by ignoring the predetermined operating limit.

10. The method of claim 6, wherein
the refrigerant leak protection system is a sealed compressor protection system for a compressor in the climate control circuit, and
the operating instruction causes the climate controller to ignore a predetermined shutdown parameter for operating the compressor in the climate control circuit.

11. The method of claim 6, further comprising:
a first user device providing an operation input for the climate controlled transport unit to the remote management device, the operation input causing the remote management device to perform the transmitting of the operating instruction.

12. The method of claim 11, wherein
the operation input is cargo value information relating to at least one of price and delivery criticality of cargo in the climate controlled space of the climate controlled transport unit; and
the operating instruction is generated by the remote management device based on the cargo value information.

13. The remote management system of claim 6, wherein the operating instruction causes the climate controller to modify a predetermined operation setting of the climate controller for operating the climate control circuit.

14. The remote management system of claim 6, wherein the operating instruction causes the climate controller to override a predetermined operating limit for activating the refrigerant leak protection system.

15. A remote management system for a transport climate control system (TCCS) of a climate controlled transport unit, the TCCS including a climate control circuit for conditioning an internal space of the climate controlled transport unit, the climate control circuit containing refrigerant, the remote management system comprising:
a remote management device configured to:
receive performance data for the climate control circuit from a climate controller of the TCCS, the remote management device being remote from the climate controlled transport unit, the performance data based on one or more detected operating parameters of the climate control circuit, and
compare the performance data for the climate control circuit to average performance for a model of TCCS matching the TCCS of the climate controlled transport unit,
generate a refrigerant leak warning based on the comparison of the performance data and the average performance for a type of TCCS matching the TCCS of the climate controlled transport unit, and
transmit the refrigerant leak warning to the climate controller.

16. The remote management system of claim 15, wherein the remote management device is configured to transmit an operating instruction to the climate controller, the operating instruction causing the climate controller to override a refrigerant leak protection system of the climate controlled transport unit.

17. A transport climate control system (TCCS) for a climate controlled transport unit, comprising:
a climate control circuit configured to climate condition an internal space of the climate controlled transport unit, the climate control circuit containing refrigerant;
a climate controller connected to a telematics unit, the climate controller configured to:
control operation of the climate control circuit, detect one or more operating parameters of the climate control circuit, generate performance data for the climate control circuit based on the one or more operating parameters of the climate control circuit, and transmit performance data to a remote monitoring device that is remote from the climate controlled transport unit, via the telematics unit, wherein the climate controller is configured to receive, via the telematics unit, a refrigerant leak warning from the remote monitoring device, and the refrigerant leak warning being generated, by the remote monitoring device, based on comparing the performance data for the climate control circuit to average performance for a model of TCCS matching the TCCS of the climate controlled transport unit.

18. The TCCS of claim 17, wherein the remote monitoring device includes a remote server.

19. The TCCS of claim 17, wherein the performance data includes one or more of: refrigerant superheat, refrigerant subcooling, a temperature of working fluid in the climate control circuit, a pressure of the working fluid, status of an isolation valve in the climate control circuit, amperage to a compressor in the climate control circuit, a valve position of an expansion valve in the climate control circuit, and a status of a refrigerant leak protection system for the climate control circuit.

20. The TCCS of claim 17, wherein the climate controller is configured to receive, via the telematics unit, an operating instruction from the remote monitoring device, the operating instruction causing the climate controller to override a refrigerant leak protection system of the climate controlled transport unit.

* * * * *